United States Patent
Sullivan et al.

(10) Patent No.: US 8,301,735 B1
(45) Date of Patent: Oct. 30, 2012

(54) VARIABLE AAA LOAD DISTRIBUTION FOR PDSN

(75) Inventors: Terry Sullivan, Pequannock, NJ (US); Carlos A. Cazanas, Bethlehem, PA (US); Azam Khan, Franklin, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 460 days.

(21) Appl. No.: 12/572,662

(22) Filed: Oct. 2, 2009

(51) Int. Cl.
*G06F 15/177* (2006.01)
*H04B 7/00* (2006.01)

(52) U.S. Cl. ........ 709/220; 709/222; 709/228; 370/310; 370/338

(58) Field of Classification Search .................. 709/220, 709/222, 228; 370/310, 338
See application file for complete search history.

(56) References Cited

U.S. PATENT DOCUMENTS

| | | |
|---|---|---|
| 7,277,416 B1 | 10/2007 | Chang et al. |
| 7,545,761 B1 | 6/2009 | Kalbag |
| 2003/0235168 A1 | 12/2003 | Sharma et al. |
| 2005/0096048 A1 | 5/2005 | Clare et al. |
| 2005/0143087 A1 | 6/2005 | Touati et al. |
| 2005/0148314 A1* | 7/2005 | Taglienti et al. ............... 455/403 |
| 2007/0195788 A1 | 8/2007 | Vasamsetti et al. |
| 2007/0230413 A1* | 10/2007 | Gandhi et al. ................. 370/338 |
| 2009/0103454 A1* | 4/2009 | Watanabe et al. ............. 370/254 |
| 2010/0248770 A1* | 9/2010 | Shuman et al. ............... 455/518 |

* cited by examiner

*Primary Examiner* — Djenane Bayard

(57) ABSTRACT

A packet data serving node (PDSN) may manage sessions between mobile devices and a packet-based network. The PDSN may send requests to and receive responses from an authentication, authorization, and accounting (AAA) server. The PDSN may include a packet session manager configured to create, maintain, and terminate the sessions between the mobile devices and the packet-based network. The PDSN may include a global AAA manager. The global AAA manager may be configured to determine a latency in communication between the PDSN and the AAA server based on latencies in responses from the AAA server to at least two requests which the PDSN sends to the AAA server. The global AAA manager may be configured to determine an adjustment in a load which may be imposed on the AAA sever based on the determined latency and to cause the determined adjustment in the load which may be imposed on the AAA server to be implemented.

23 Claims, 3 Drawing Sheets

| Latency | Shedding |
|---------|----------|
| 15% | 10% |
| 30% | 25% |
| 45% | 45% |
| 60% | 60% |
| 100% | 100% |
Fig. 4
| Load Adjustment Parameters | |
|---|---|
| Sample Period: | 3 seconds |
| Maximum Latency: | 1500 ms |
| Time Out: | 1750 ms |
| Recovery Delay: | 10 sec |
Fig. 7
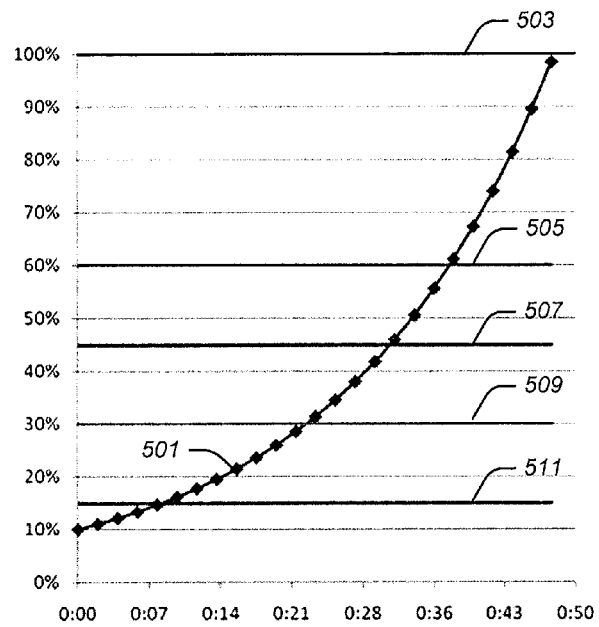
Fig. 5
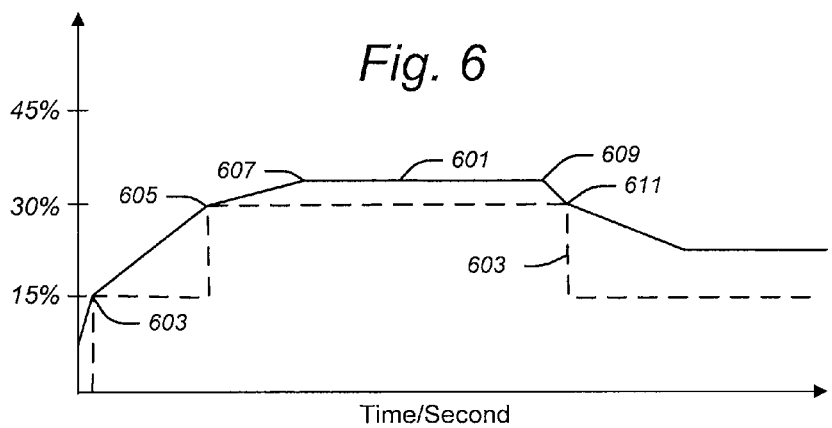
Fig. 6

VARIABLE AAA LOAD DISTRIBUTION FOR PDSN

BACKGROUND

1. Technical Field

This disclosure relates to communication systems and, more particularly, to wireless mobile communication systems which utilize a packet data serving node (PDSN) and an authentication, authorization, and accounting (AAA) server.

2. Description of Related Art

Wireless communication systems may enable one or more mobile stations to communicate with various services through one or more packet-based networks, such as the internet. To facilitate these communications, a packet data serving node (PDSN) may be configured to function as a gateway between one or more of the wireless mobile stations and one or more of the packet-based networks.

The PDSN may seek to authenticate a wireless mobile station, to verify its authorization to communicate over the packet-based network, and/or to account for that communication. A server commonly known as an authentication, authorization, and accounting (AAA) server may be used by the PDSN to facilitate these functions. The PDSN may send requests to the AAA server seeking authentication, authorization, and/or accounting services, and the AAA server may send responses back to the PDSN.

A PDSN may need to process thousands of communications with an AAA server each second. To facilitate this throughput, the PDSN may delegate the responsibility for managing small groups of these communications to a sub-system commonly known as an AAA manager (referred to herein as a "sub-AAA manager"). A single PDSN may have over one hundred such sub-AAA managers which may all operate at approximately the same time. A single AAA server, in turn, may be shared among numerous PDSNs. Thus, a single AAA server may receive tens of thousands of requests for authentication, authorization, and/or accountings services each second.

Problems may arise with the AAA server and/or the communication system between the AAA server and the PDSN. Such problems may cause the sub-AAA manager not to receive a response to a request to an AAA server in a timely manner. If a response is not received by a sub-AAA manager within a pre-determined time, the sub-AAA manager may resend the request to the AAA server. If a response is repeatedly not received by the sub-AAA manager within the pre-determined time, the sub-AAA manager may redirect future requests to a secondary AAA server.

Delays encountered by one sub-AAA manager may be encountered by all of the AAA managers at about the same time. Thus, when an unacceptable delay occurs in connection with a request being sent by one sub-AAA manager, all of the sub-AAA managers may incur the same unacceptable delay. In turn, this may cause all of the sub-AAA managers to resend their requests. This may cause the AAA server to be even further overloaded. This may further slow the responses from the AAA server, causing even more requests to be resent. The AAA server may very quickly become overloaded with more requests than it can handle. This may seriously degrade the performance of the AAA server and may cause it to shut down.

SUMMARY

A packet data serving node (PDSN) may manage sessions between mobile devices and a packet-based network. The PDSN may send requests to and receive responses from an authentication, authorization, and accounting (AAA) server. The PDSN may include a packet session manager configured to create, maintain, and terminate the sessions between the mobile devices and the packet-based network. The PDSN may include a global AAA manager. The global AAA manager may be configured to determine a latency in communication between the PDSN and the AAA server based on latencies in responses from the AAA server to at least two requests which the PDSN sends to the AAA server. The global AAA manager may be configured to determine an adjustment in a load which may be imposed on the AAA sever based on the determined latency and to cause the determined adjustment in the load which may be imposed on the AAA server to be implemented.

The PDSN may include a plurality of sub-AAA managers. Each may be configured to manage a subset of the requests to and the responses from the AAA server. The global AAA manager may be configured to determine the latency in communication between the PDSN and the AAA server based on the latencies in the responses from the AAA server to the requests which are made by all of the sub-AAA managers. The global AAA manager may be configured to determine the latency in communication between the PDSN and the AAA server by averaging all of the latencies in the responses from the AAA server to the requests which are made by all of the sub-AAA managers.

The global AAA manager may be configured to treat a request from the PDSN to which no response is received from the AAA server within a pre-determined time as a response from the AAA server with a pre-determined latency.

The global AAA manager may be configured to cause the determined adjustment in the load which may be imposed on the AAA server to be implemented by causing a portion of the requests to be redirected to a second AAA server.

The global AAA manager may be configured to cause the determined adjustment in the load which may be imposed on the AAA server to be implemented by causing a portion of the sub-AAA managers to redirect their requests to the second AAA server.

The global AAA manager may be configured to determine the adjustment based on whether the determined latency meets one of a set of threshold values. The set of threshold values may include pre-determined percentages of a maximum threshold value.

The global AAA manager may be configured to determine an adjustment which decreases the load when the determined latency exceeds a threshold value. The global AAA manager may be configured to determine an adjustment which increases the load when the determined latency falls below a threshold value.

The global AAA manager may be configured to issue an alert each time the global AAA manager determines an adjustment in the load which decreases the load.

The adjustment in the load may represent the load which all communications from the PDSN to the AAA server may collectively impose on the AAA server based on the determined latency.

The global AAA manager may be configured to determine a latency in communication between the PDSN and the AAA server based on a latency in a response from the AAA server to just one request which the PDSN sends to the AAA server.

Computer-readable storage media containing computer-readable instructions may be configured to cause a computer system to implement one or more of the functions described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 4 is a table of example latency and corresponding shedding values.

FIG. 5 is a graph of an example latency problem in responses from an AAA server to requests from a PDSN which is not addressed with load adjustments of the type described herein.

FIG. 6 is a graph of an example latency problem in responses from an AAA server to requests from a PDSN which is addressed with load adjustments of the type described herein.

FIG. 7 is a table of example load adjustment parameters for the automatic regulation of a load imposed by a PDSN on an AAA server.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
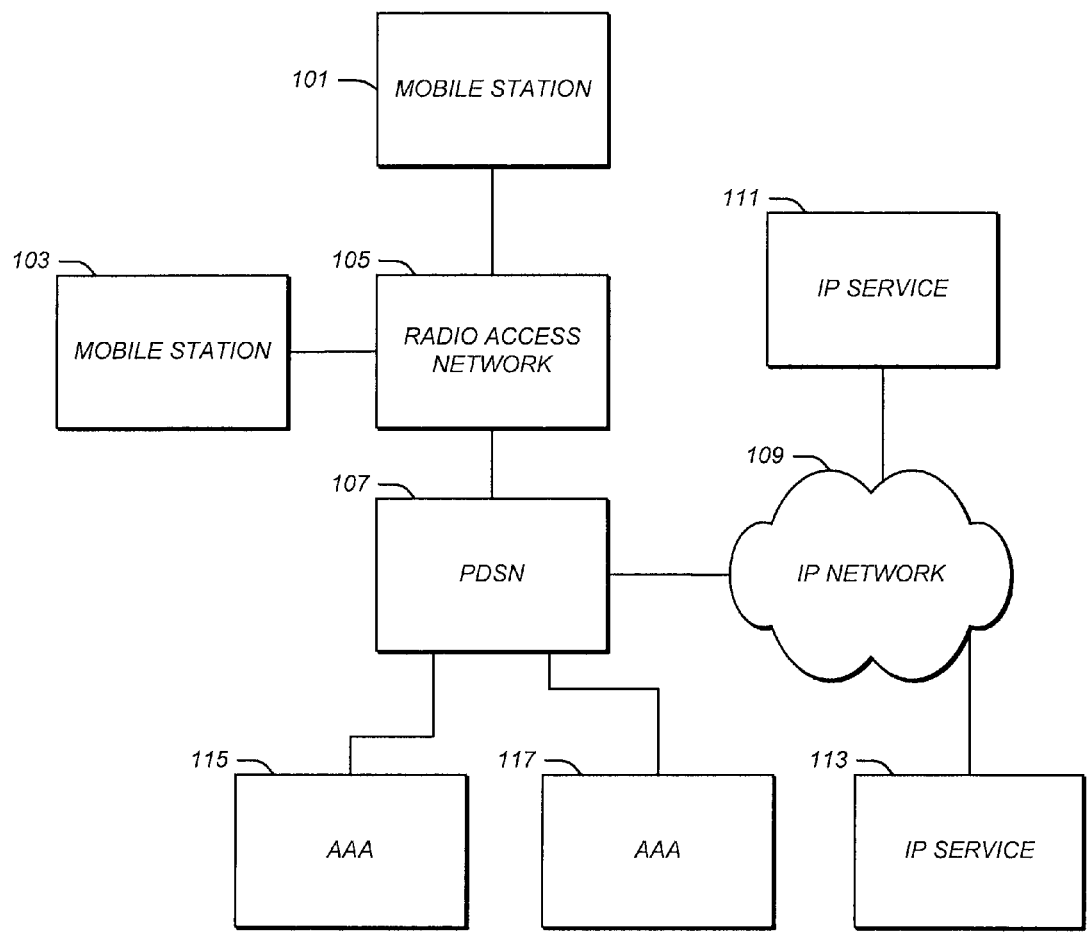
FIG. 1 illustrates an example mobile communication network which provides packet data communications.

FIG. 1 illustrates an example mobile communication network which provides packet data communications. As illustrated in FIG. 1, one or more mobile stations, such as mobile stations 101 and 103, may communicate wirelessly with a radio access network 105.

Each mobile station may be of any type. For example, each mobile station may consist of or include a cell phone, a laptop with an aircard, a portable multimedia device, such as a smart phone, and/or a messaging device.

The radio access network 105 may be configured to implement radio access technology. It may be configured to facilitate communication between each of the mobile stations, such as the mobile stations 101 and 103, and a wireless service provider network (not shown in FIG. 1). There may be additional mobile stations.

The radio access network 105 may communicate with one or more packet data serving nodes (PDSNs), such as a PDSN 107. Each PDSN may be configured to function as a gateway between one or more of the mobile stations and a packet-based network, such as an IP network 109. Each PDSN may be configured to manage sessions between one or more of the mobile stations and the packet-based network. Each session may include communications between a mobile station and one or more IP services that are part of the IP network, such as IP services 111 and 113. Each IP service may provide information to and/or receive information from a mobile station. An IP service may include, for example, a website, an email server, and/or a source of streaming multi-media.

The PDSN may function as a foreign agent (FA), a home agent (HA), and/or in any other capacity. Data packets that are communicated between each mobile station and an IP service may flow through the PDSN.

As indicated in the Description of Related Art above, the PDSN may seek to authenticate a mobile station, to verify its authorization to communicate with the IP network 109, and/or to account for the utilization of the IP network. To facilitate this, and as also explained above, one or more authentication, authorization, and accounting (AAA) servers may be provided, such as AAA servers 115 and 117. There may be additional AAA servers.

Each AAA server may be configured to receive requests from a PDSN for authentication, authorization, and/or accounting services and to provide appropriate responses. Each PDSN may be configured to communicate with a primary AAA server and, in the event of a problem, with a secondary AAA server. Although not shown in FIG. 1, many PDSNs may be configured to communicate with the same primary and/or secondary AAA server.

Each PDSN may be configured to communicate with an AAA server through any means. This means may consist of or include a wired and/or wireless network, such as a local area network, a wide area network, and/or the internet.

Figure 2:
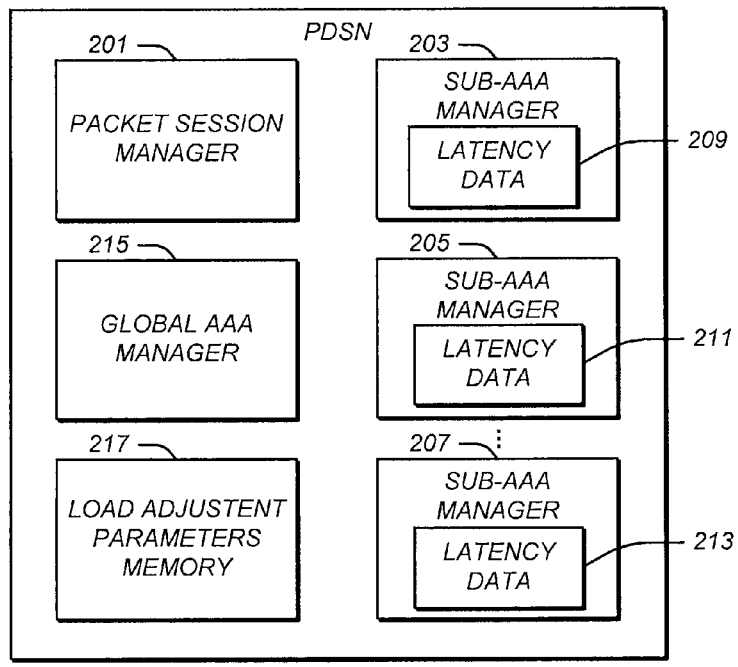
FIG. 2 illustrates an example packet data serving node (PDSN) which automatically regulates a load it imposes on an authentication, aurthorization, and accounting (AAA) server.

FIG. 2 illustrates an example PDSN which automatically regulates a load it imposes on an AAA server. The PDSN illustrated in FIG. 2 may be used as the PDSN 107 illustrated in FIG. 1 or in any other type of mobile communication network. A PDSN other than of the type illustrated in FIG. 2 may instead be used as the PDSN 107 illustrated in FIG. 1.

As illustrated in FIG. 2, the PDSN may include a packet session manager 201. The packet session manager may be configured to create, maintain, and/or to terminate sessions between mobile stations that are communicating with the PDSN and a packet-based network. The packet session manager 201 may be configured to assign a dynamic IP address to each mobile station during a session. The packet session manager 201 may be configured to provide other services.

The PDSN may include a plurality of sub-AAA managers, such as sub-AAA managers 203, 205, and 207. Although only three sub-AAA managers are illustrated in FIG. 2, the PDSN may, in fact, have a much larger number of sub-AAA managers, such as in excess of 100.

Each sub-AAA manager may be configured to manage a small number of communications between the PDSN and an AAA server. That small number, for example, may be in the range of 1-5. Each sub-AAA manager may be configured to initiate requests to the AAA server for authentication, authorization, and/or accounting services at approximately the same time as such requests are being initiated by the other sub-AAA managers.

Each sub-AAA manager may be configured to process responses from the AAA server which are received to requests which the sub-AAA manager sends to the AAA server. As part of this management, each sub-AAA manager may be configured to store latency data. For example, sub-AAA managers 203, 205, and 207 may be configured to store latency data 209, 211, and 213, respectively.

The latency data may relate to how long it takes for the PDSN to receive a response from the AAA server to each request which the sub-AAA manager sends. The latency data may be of any type or in any form. For example, the time at which each sub-AAA manager sends each request to the AAA server may be recorded as the latency data or as part of that data. Upon receiving a response to a request, latency may be determined by subtracting the time when the request was made, as reflected by the latency data, from the time the response was received. This latency determination may or may not be recorded as part of the latency data.

In another example, each outgoing request to an AAA server may be stamped with the time of its departure. The AAA server may, in turn, include this time stamp in its response. When the response is received, the latency in the communication with the AAA server may be determined by subtracting the time stamp of its departure that is included within the response from the time at which the response was received by the PDSN. This latency determination, the time stamp, and/or the time of receipt of the response at the PDSN may or may not recorded as part of the latency data.

In some cases, a response from the AAA server may not be received in a timely manner. Indeed, a response may never be received. A timer for each outgoing request to an AAA server may be set within the PDSN to expire within a pre-determined time after the issuance of the request. If a response is not received from the AAA server within that pre-determined time, the request may be treated by the PDSN as nevertheless having received a response from the AAA server with a pre-determined latency.

For example, a time may be set for a pre-determined time of 1.5 or 1.75 seconds. If no response to a request is received within this time, a response may nevertheless be deemed to have been received with a pre-determined latency, such as a latency of 1.5 or 1.75 seconds. Although equal in this example, the pre-determined latency need not be the same as the period of the timer. Again, this deemed latency may or may not be stored as part of latency data.

Figure 3:
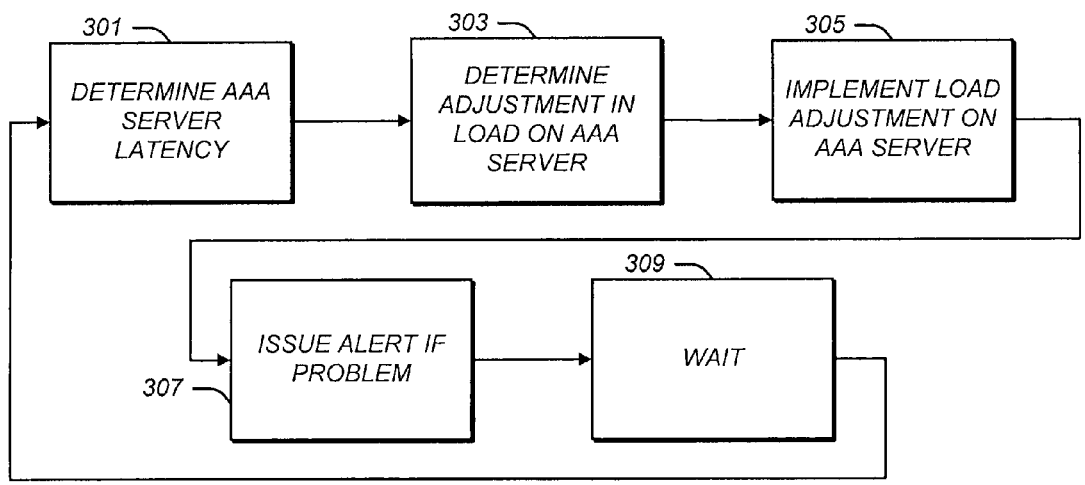
FIG. 3 is a flow diagram of an example load adjustment process for the automatic regulation of a load imposed by a PDSN on an AAA server.

The PDSN may include a global AAA manager 215. The global AAA manager 215 may be configured to perform a variety of functions. Examples of these will now be discussed in connection with FIG. 3, which is a flow diagram of an example load adjustment process for the automated regulation of a load imposed by a PDSN on an AAA server.

The global AAA manager 215 may be configured to determine an AAA server latency, as reflected in a Determine AAA Server Latency step 301. The global AAA manager 215 may be configured to determine this latency using any method. For example, the global AAA manager 215 may be configured to request and receive reports from each of the sub-AAA managers, such as the sub-AAA managers 203, 205, and 207, about latencies in responses from the AAA server which are being experienced by each of the sub-AAA managers. The latency data may contain this information in whole or in part. This information may instead be delivered to the global AAA manager 215 without a request from the global AAA manager for it.

The latency information which is delivered to the global AAA manager 215 may be of any type. For example, the latency information may include information about some, but not necessarily all of the latencies which each sub-AAA manager is experiencing. In another example, all of the latency information about all of the sub-AAA managers may be provided to the global AAA manager 215. In a still further example, latency information from only some or even only one of the sub-AAA managers may be provided.

The history covered by the latency data which is sent to the global AAA manager 215 may vary. In one example, only latency data concerning the very latest request or set of requests which were handled by a sub-AAA manager may be sent. In another example, a longer latency history may be sent.

In still other examples, the global AAA manager 215 may be configured to determine and/or acquire latency information itself and/or from some other sub-system.

The global AAA manager 215 may be configured to determine the latency in communication between the PDSN and the AAA server based on any function which is applied to the latency data which it receives. For example, the global AAA manager 215 may be configured to determine the latency in communication between the PDSN and the AAA server by calculating an average value of all of the individual request/response latency data. A calculation of a mean may instead be made. The latency data which is used in this calculation may vary. For example, it may include only the most recent latency data which is received, or it may include a longer history of latency data. Different weights may be assigned to the latency data based on its age. For example, more recent latency data may be given more weight than older latency data. Aberrations in the latency data may be included in the computation or ignored.

The global AAA manager 215 may be configured to determine an adjustment in a load which may be imposed on the AAA server by the PDSN, as reflected by a Determine Adjustment In Load On AAA Server step 303. During this step, the global AAA manager 215 may be configured to determine whether the latency which it calculated during step 301 justifies a change in the load which the PDSN is imposing on the AAA server and, if so, the amount of an adjustment which should be made.

The global AAA manager 215 may be configured to make this adjustment determination based on a single latest latency determination, such as the latest latency determination, or based on a number of latency determinations. If multiple latency determinations are used, they may be weighted equally or differently.

The global AAA manager 215 may be configured to cause the determined adjustment in the load on the AAA server to be implemented, as reflected by an Implement Load Adjustment on AAA Server step 305. During this step, for example, the global AAA manager 215 may direct one, some, or all of the sub-AAA managers, such as the sub-AAA managers 203, 205, and/or 207, to shed all future requests to a secondary AAA server, thus lightening the load on the primary AAA server. The global AAA manager 215 may be configured to instead direct one, some, or all of the sub-AAA managers to shed only a portion of their future requests to a secondary AAA server. The global AAA manager 215 may be configured so as to cause the totality of the requests which are being sent to the primary AAA server to thereby be adjusted in accordance with the adjustment that was determined in step 303.

The global AAA manager 215 may be configured to determine the adjustment in step 303 based on a function of the latency determined in step 301. Any functional relationship may be used. The functional relationship may or may not be linear and/or continuous.

For example, the global AAA manager 215 may be configured to adjust the load on the AAA server in discrete steps. The taking of each step may depend upon whether the determined latency reaches or falls below a threshold value for each step. Several thresholds may be used. When a set of thresholds is used, the set may include or consist of a maximum determined latency and a sub-set of lower thresholds which represent different percentages of this maximum.

FIG. 4 is a table of example latency and corresponding shedding values. It is an example of the discrete steps approach discussed above. The left column of FIG. 4 illustrates latency values as a percentage of a maximum latency value. The right column illustrates the corresponding adjustment determination, e.g., the percentage of requests which the global AAA manager 215 may be configured to cause the sub-AAA managers to collectively shed as a result.

For example, if the determined latency is below 15% of the maximum specified latency, the global AAA manager 215 may be configured not to cause the sub-AAA managers to shed any portion of their requests to the primary AAA server. When the latency reaches 15% of the maximum, the global AAA manager 215 may be configured to cause the sub-AAA managers to collectively shed 10% of their requests to a secondary AAA server. Each time the latency reaches a higher level, the global AAA manager 215 may be configured to cause the sub-AAA managers to collectively shed a greater portion of their requests to the secondary AAA server. If the determined latency reaches 100% of the maximum value, the global AAA manager 215 may be configured to cause the sub-AAA managers to collectively shed 100% of their requests to the secondary AAA server, i.e., all of their future requests.

As also reflected in FIG. 4, the percentage of shedding need not match the percentage of the maximum latency. Further, the relationship between changes in the determined latency and changes in the shedding need not be linear. This is also illustrated in FIG. 4 by the fact that a 15% increase in the latency from 15% to 30% results in a 15% increase in the shedding, but that a 15% increase in the latency from 30% to 45% results in a 20% increase in the shedding.

The global AAA manager 215 may instead be configured to calculate the shedding as a continuous function of the determined latency based on a formula. Again, the relationship between changes in the determined latency and changes in the determined shedding may or may not be linear.

During the implement load adjustment step 305, the global AAA manager 215 may be configured to compare the amount of shedding which is currently taking place (due to an earlier computation and adjustment) with the amount of shedding which it has most recently determined should take place. If the current amount is less than the determined amount, the global AAA manager 215 may be configured to determine and implement an upward adjustment in the shedding. Conversely, if the current shedding level is above the needed amount, the global AAA manager 215 may be configured to determine and implement a downward adjustment in the amount of shedding.

The net effect of these configurations and operations may be to protect an AAA server from an overload and to improve the overall performance of a PDSN. This may be accomplished by making gradual downward or upward changes in the load which the PDSN imposes upon the AAA server. The amount of these changes may vary in degree continuously or in discrete steps. The degree of the changes may be based on an average or other type of collective assessment of latencies in responses to individual requests to the AAA server from the sub-AAA managers.

FIG. 5 is a graph of an example latency problem in responses from an AAA server to requests from a PDSN which is not addressed with load adjustments of the type described herein. The X axis represents time, and the Y axis represents percentages of a maximum permissible latency. As illustrated in FIG. 5, the collective latency 501 in these responses can rapidly grow. This can ultimately cause a shut down of the AAA server.

Latency thresholds 503, 505, 507, 509, and 511 are included in FIG. 5 as an example of a set of stepped-latency thresholds that may be employed, although no load adjustments are shown in FIG. 5 as being made in connection with them. They are illustrated as having the same values as set forth in the table in FIG. 4. Of course, there may be a different number of thresholds, they may have different values, and a continuous function may instead be used.

FIG. 6 is a graph of an example latency problem in responses from an AAA server to requests from a PDSN which is addressed with load adjustments of the type described herein. The X axis represents time, the Y axis represents percentages of a maximum pre-determined latency, a solid line 601 illustrates determined latencies, and a dotted line 603 illustrates determined adjustments. As illustrated in FIG. 5, the latency and responses from an AAA server at an initial time may be below a first 15% threshold. The global AAA manager 215 may be configured to provide no adjustment in the shedding when the determined latency is this low. The determined latency may then rise until it reached the first 15% level at a time 603. The global AAA manager 215 may then cause the PDSN to shed 10% of its request to a secondary AAA server. This may reduce the rate of latency increases. However, it may not be enough to prevent the latency from continuing to rise. Thus, the determined latency may reach the second 30% latency threshold at a time 605. The global AAA manager 215 may then cause the shedding to increase to 25%. This may further reduce the rate of latency increases until it ultimately stabilizes at a time 607. Later, the latency may begin to decline at a time 609 due to a falloff in requests and/or for other reasons until it falls back at a time 611 to the 30% latency threshold. At this point, the global AAA manager 215 may cut back the shedding to the 10% level.

Although changes in the shedding have thus-far been illustrated as being in discrete steps, the changes in the shedding may instead be implemented on a continuous basis, rather than in discrete steps. When implemented in steps, moreover, the amounts between each step and the number of steps may be different.

Returning to FIG. 3, the global AAA manager 215 may be configured to issue an alert in response to each incremental increase and/or each incremental decrease in the shedding, as reflected by an Issue Alert if Problem step 307. During this step, the global AAA manager 215 may cause an alert to be issued to persons and/or systems responsible for the PDSN and/or the AAA servers. These persons may then take other steps to reduce the latencies and/or to minimize their consequences. Although having been described as being issued after each incremental increase and/or decrease in the shedding, the global AAA manager 215 may be configured to issue a lesser number of alerts, such as only when the determined latency is at a level which threatens to bring down the AAA server or has returned to a certain prior level or an operational state.

The alerts may be sent using any means and in any form. For example, the alerts may be sent via SNMP to a centralized SNMP management station which may be configured to receive alerts from several PDSNs. Each alert may begin with an O.I.D. code which is indicative of the nature of the alert. Each alert may be followed by an O.I.D. code which contains additional information about the alert, such as the percentage of sub-AAA managers within the PDSN that have been moved to a secondary AAA server and/or the percentage of requests from the PDSN which are being redirected to a secondary AAA server.

The centralized SNMP management station may be configured to poll the PDSNs for any or all of this AAA load status information by delivering requests to them for this information. This polling may be done on a periodic or other basis. The PDSNs may be configured to respond by delivering the requested status information to the SNMP management station.

The centralized SNMP management station may be configured to analyze the alerts and/or responses to polling requests from the PDSNs and to generate reports that will aid in making configuration and/or other changes that may improve the overall performance of the system.

The global AAA manager 215 may be configured to wait after each load adjustment cycle, as reflected by a Wait step 309. The amount of this wait may relate to a desired frequency at which the global AAA manager 215 should be making adjustments. Increasing the frequency of these adjustments beyond a certain amount may not improve performance, while it may utilize valuable processing time. If the period is too long, on the other hand, the global AAA manager may not act quickly enough to prevent a shut down of the primary AAA server.

Various parameters relating to the load adjustment process may be received from an operator or another source and stored in a memory, as reflected by load adjustment parameters memory 217 in FIG. 2. A broad variety of such parameters may be received and stored.

FIG. 7 is a table of example load adjustment parameters for the automatic regulation of a load imposed by a PDSN on an AAA server. As reflected in FIG. 7, one load adjustment parameter may be a Sample Period. This period may govern the frequency at which the global AAA manager 215 determines latency and makes associated load adjustments. This period may be used as the period of the Wait step 309 in FIG. 3.

As also reflected in FIG. 7, another parameter may be a Maximum Latency. This parameter may reflect the maximum determined latency beyond which all requests from the PDSN should be shed to a secondary AAA server. This Maximum Latency parameter may be used in the computation of the various latency thresholds which have been described above. These thresholds may be automatically calculated by equating them with pre-determined percentages of the Maximum Latency parameter, such as 15%, 30%, 45%, 60%, and 100%, as illustrated in FIG. 4. Alternatively, the value of each threshold may be the subject of a separate parameter in the load adjustment parameters table.

A still further parameter may be a Time Out parameter. This parameter may specify the maximum amount of time which each sub-AAA manager should wait to receive a response to a request. If this time is exceeded, the sub-AAA manager may be configured to deem the PDSN to have received a response from the AAA server at the end of the timed-out period or at any other time. The occurrence of a time-out may also be used by one or more of the sub-AAA managers as a trigger to resend the request to the primary AAA server. If a response is not received within the time-out period after a pre-determined number of attempts, the sub-AAA manager may be configured on its own to redirect all further requests to a secondary AAA server.

Each of the various systems, devices, components, elements, and blocks which have been illustrated in FIGS. 1 and 2 and discussed above may be implemented with computer hardware or a combination of computer hardware and computer software. The computer hardware may include one or more processors, memory devices, storage devices (such as hard disk drives, RAMS, and/or PROMS), and/or user interface devices (such as one or more keyboards, mice, and/or displays). When including software, the software may include computer-readable instructions coded to implement one, some, or all of the functions which are recited in connection with each component, element, or block. For example, the packet session manager 201, global AAA manager 215, and each of the sub-AAA managers may be implemented by specific configurations of hardware and software algorithms, each of which is configured to implement one or more of the functions of these components which have been described herein. All or portions of the software may be stored on computer-readable storage media, such as one or more hard disk drives, CD's, DVD's, flash memories, and/or PROMS.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, a PDSN may be configured to shed requests from a secondary AAA server to a tertiary AAA server if there are problematic latencies in the communications with the secondary AAA server. The shedding may be performed in the same way and using the same equipment as has been described above in connection with shedding to a secondary AAA server. Additional back-up AAA servers may also be provided and the PDSN may be configured to successively shed to these as well, when needed.

Although the global AAA manager 215 has thus-far been described as determining AAA server latency based on a plurality of individual request/response latency reports, it may instead determine the latency based on only a single report.

Although having been discussed in connection with PDSNs and AAA servers, the load balancing systems and methods which have been described may be used in connection with other types of clients and servers.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim embraces the corresponding acts that have been described and their equivalents. The absence of these phrases means that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A packet data serving node (PDSN) for managing sessions between mobile devices and a packet-based network, including making requests to and receiving responses from an authentication, authorization, and accounting (AAA) server, the PDSN comprising:
   a packet session manager configured to create, maintain, and terminate the sessions between the mobile devices and the packet-based network; and
   a global AAA manager configured to:
      determine a latency in communication between the PDSN and the AAA server based on latencies in responses from the AAA server to at least two requests which the PDSN sends to the AAA server;
      determine an adjustment in a load which may be imposed on the AAA sever based on the determined latency; and
      cause the determined adjustment in the load which may be imposed on the AAA server to be implemented,
   wherein the packet session manager and the global AAA manager each include computer hardware, including one or more processors and memory devices.

2. The PDSN of claim 1 further comprising a plurality of sub-AAA managers, each configured to manage a subset of the requests to and the responses from the AAA server, and wherein the global AAA manager is configured to determine the latency in communication between the PDSN and the AAA server based on the latencies in the responses from the AAA server to the requests which are made by all of the sub-AAA managers.

3. The PDSN of claim 2 wherein the global AAA manager is configured to determine the latency in communication between the PDSN and the AAA server by averaging all of the latencies in the responses from the AAA server to the requests which are made by all of the sub-AAA managers.

4. The PDSN of claim 1 wherein the global AAA manager is configured to treat a request from the PDSN to which no response is received from the AAA server within a pre-determined time as a response from the AAA server with a pre-determined latency.

5. The PDSN of claim 1 wherein the AAA server is a first AAA server and wherein the global AAA manager is configured to cause the determined adjustment in the load which may be imposed on the AAA server to be implemented by causing a portion of the requests to be redirected to a second AAA server.

6. The PDSN of claim 5 further comprising a plurality of sub-AAA managers, each configured to manage a subset of the requests to and the responses from the first AAA server, and wherein the global AAA manager is configured to cause the determined adjustment in the load which may be imposed on the AAA server to be implemented by causing a portion of the sub-AAA managers to redirect their requests to the second AAA server.

7. The PDSN of claim 1 wherein the global AAA manager is configured to determine the adjustment based on whether the determined latency meets one of a set of threshold values.

8. The PDSN of claim 7 wherein the set of threshold values include pre-determined percentages of a maximum threshold value.

9. The PDSN of claim 1 wherein the global AAA manager is configured to determine an adjustment which decreases the load when the determined latency exceeds a threshold value.

10. The PDSN of claim 1 wherein the global AAA manager is configured to determine an adjustment which increases the load when the determined latency falls below a threshold value.

11. The PDSN of claim 10 wherein the global AAA manager is configured to issue an alert each time the global AAA manager determines an adjustment in the load which represents a decrease in the load.

12. The PDSN of claim 1 wherein the adjustment in the load which the global AAA manager is configured to determine is an adjustment in the load which all communications from the PDSN to the AAA server may collectively impose on the AAA server based on the determined latency.

13. A packet data serving node (PDSN) for managing sessions between mobile devices and a packet-based network, including making requests to and receiving responses from an authentication, authorization, and accounting (AAA) server, the PDSN comprising:
   a packet session manager configured to create, maintain, and terminate the sessions between the mobile devices and the packet-based network; and
   a global AAA manager configured to:
      determine a latency in communication between the PDSN and the AAA server based on a latency in a response from the AAA server to at least one request which the PDSN sends to the AAA server;
      determine an adjustment in a load which all communications from the PDSN to the AAA server may collectively impose on the AAA server based on the determined latency; and
      cause the determined adjustment in the load which all communications from the PDSN may collectively impose on the AAA server to be implemented
   wherein the packet session manager and the global AAA manager each include computer hardware, including one or more processors and memory devices.

14. The PDSN of claim 13 wherein the global AAA manager is configured to treat a request from the PDSN to which no response is received from the AAA server within a pre-determined time as a response from the AAA server with a pre-determined latency.

15. The PDSN of claim 13 wherein the AAA server is a first AAA server and wherein the global AAA manager is configured to cause the determined adjustment in the load which may be imposed on the AAA server to be implemented by causing a portion of the requests to be redirected to the second AAA server.

16. The PDSN of claim 15 further comprising a plurality of sub-AAA managers, each configured to manage a subset of the requests to and the responses from the first AAA server, and wherein the global AAA manager is configured to cause the determined adjustment in the load which may be imposed on the AAA server to be implemented by causing a portion of the sub-AAA managers to redirect their requests to the second AAA server.

17. The PDSN of claim 13 wherein the global AAA manager is configured to determine the adjustment based on whether the determined latency meets one of a set of threshold values.

18. The PDSN of claim 17 wherein the set of threshold values include pre-determined percentages of a maximum threshold value.

19. The PDSN of claim 13 wherein the global AAA manager is configured to determine an adjustment which decreases the load when the determined latency exceeds a threshold value.

20. The PDSN of claim 13 wherein the global W manager is configured to determine an adjustment which increases the load when the determined latency falls below a threshold value.

21. The PDSN of claim 13 wherein the global AAA manager is configured to issue an alert each time the global AAA manager determines an adjustment in the load which represents a decrease in the load.

22. A tangible, non-transitory, computer-readable, storage medium containing computer-readable instructions which are configured to cause a computer system to:
   determine a latency in communication between the PDSN and the AAA server based on latencies in responses from the AAA server to at least two requests which the PDSN sends to the AAA server;
   determine an adjustment in a load which may be imposed on the AAA sever based on the determined latency; and
   cause the determined adjustment in the load which may be imposed on the AAA server to be implemented.

23. A tangible, non-transitory, computer-readable, storage medium containing computer-readable instructions which are configured to cause a computer system to:
   determine a latency in communication between the PDSN and the AAA server based on a latency in a response from the AAA server to at least one request which the PDSN sends to the AAA server;
   determine an adjustment in a load which all communications from the PDSN to the AAA server may collectively impose on the AAA server based on the determined latency; and
   cause the determined adjustment in the load which all communications from the PDSN may collectively impose on the AAA server to be implemented.

* * * * *

UNITED STATES PATENT AND TRADEMARK OFFICE
CERTIFICATE OF CORRECTION

| | | |
|---|---|---|
| PATENT NO. | : 8,301,735 B1 | Page 1 of 1 |
| APPLICATION NO. | : 12/572662 | |
| DATED | : October 30, 2012 | |
| INVENTOR(S) | : Terry Sullivan et al. | |

It is certified that error appears in the above-identified patent and that said Letters Patent is hereby corrected as shown below:

In the Claims

In Claim 1, column 11, line 19, please replace the word "SEVER" with the word "SERVER" as follows:

--imposed on the AAA server based on the determined--

Signed and Sealed this
Twenty-eighth Day of October, 2014

Michelle K. Lee
*Deputy Director of the United States Patent and Trademark Office*